US011665420B2

(12) United States Patent
Moncino et al.

(10) Patent No.: US 11,665,420 B2
(45) Date of Patent: May 30, 2023

(54) SECURITY CAMERA INSTALLATION SYSTEMS AND METHODS (71) Applicant: Teledyne FLIR Commercial Systems, Inc., Goleta, CA (US)

(72) Inventors: Kai Moncino, Santa Barbara, CA (US); Marcel Tremblay, Goleta, CA (US); John H. Distelzweig, Santa Barbara, CA (US)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 288 days.

(21) Appl. No.: 16/812,098

(22) Filed: Mar. 6, 2020

(65) Prior Publication Data
US 2020/0236262 A1 Jul. 23, 2020

Related U.S. Application Data

(63) Continuation of application No. PCT/US2018/052991, filed on Sep. 26, 2018.

(60) Provisional application No. 62/563,624, filed on Sep. 26, 2017.

(51) Int. Cl.
*H04N 23/57* (2023.01)
*F16M 11/04* (2006.01)
*F16M 11/14* (2006.01)
*F16M 13/02* (2006.01)
*H04N 23/51* (2023.01)
*H04N 23/617* (2023.01)
*H01R 13/631* (2006.01)

(52) U.S. Cl.
CPC ........... *H04N 23/57* (2023.01); *F16M 11/041* (2013.01); *F16M 11/14* (2013.01); *F16M 13/02* (2013.01); *H04N 23/51* (2023.01); *H04N 23/617* (2023.01); *H01R 13/631* (2013.01)

(58) Field of Classification Search
None
See application file for complete search history.

(56) References Cited

U.S. PATENT DOCUMENTS

| 4,502,552 | A | * | 3/1985 | Martini .................. E21B 17/07 175/321 |
| 6,234,691 | B1 | | 5/2001 | Jones et al. |
| 6,357,936 | B1 | | 3/2002 | Elberbaum |
| 6,992,723 | B1 | | 1/2006 | Wulf et al. |
| 9,674,450 | B2 | | 6/2017 | Mohan |
| 2008/0056709 | A1 | | 3/2008 | Huang |

(Continued)

FOREIGN PATENT DOCUMENTS

CN 204377020 6/2015

*Primary Examiner* — Xiaolan Xu
(74) *Attorney, Agent, or Firm* — Haynes and Boone, LLP (57) ABSTRACT

Various embodiments of the present disclosure may include an imaging system that includes a base module, a camera module, an interface plate, and a locking ring. The base module may be mounted on the interface plate via one or more quick release fasteners. The camera module may then be coupled to the base module and one or more blind mate connectors may allow for the camera of the camera module to quickly connector with the base module and communicate data and/or power. A locking ring may then be coupled (e.g., threaded) onto the base module over the camera module to secure the camera module to the base module.

20 Claims, 8 Drawing Sheets

(56) References Cited

U.S. PATENT DOCUMENTS

| | | | |
|---|---|---|---|
| 2010/0100930 A1* | 4/2010 | King | H04L 63/1433 726/1 |
| 2013/0147963 A1* | 6/2013 | Henninger, III | G08B 13/1963 348/159 |
| 2016/0182803 A1 | 6/2016 | Song | |
| 2018/0158297 A1* | 6/2018 | Glock | G08B 13/1966 |

* cited by examiner

FIG. 6A UNCOMPRESSED STATE

FIG. 6B COMPRESSED STATE

FIG. 7

SECURITY CAMERA INSTALLATION SYSTEMS AND METHODS

CROSS-REFERENCE TO RELATED APPLICATION

This application is a continuation of International Patent Application No. PCT/US2018/052991 filed Sep. 26, 2018 and entitled "SECURITY CAMERA INSTALLATION SYSTEMS AND METHODS," which is incorporated herein by reference in its entirety International Patent Application No. PCT/US2018/052991 filed Sep. 26, 2018 claims priority to and the benefit of U.S. Provisional Patent Application No. 62/563,624, filed Sep. 26, 2017, which is incorporated herein by reference in its entirety.

TECHNICAL FIELD

One or more embodiments of the invention relate generally to imaging devices and more particularly to, for example, installation of camera systems.

BACKGROUND

Currently, security cameras are difficult to install due to complex cable routing and varied environments that security cameras are required to be installed within. Additionally, security cameras currently require specific installation tools, further complicating installation.

SUMMARY

In various embodiments, an imaging system may be disclosed, which may include a base module and a camera module. The base module may include a base guide and a connector bank. The connector bank may include a blind mate connector, where the blind mate connector includes a spring connector and is configured to mate with a camera connector. Camera module includes a camera guide configured to be inserted into the base guide, a camera, and a camera connector communicatively connected to the camera and configured to engage the blind mate connector when the camera guide is inserted into the base guide and communicate, at least, the audiovisual data and the power to the blind mate connector when engaged.

In various other embodiments, a method may be disclosed, which may include coupling a back module on an interface plate, routing a cable through an opening of the interface plate to the back module, terminating the cable to a connector bank of the back module, coupling a camera module to the back module by inserting a camera guide of the camera module to a back guide of the back module, and engaging a camera connector with a blind mate connector of the connector bank.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Techniques and mechanisms are provided to improve installation of camera systems. For example, in a certain embodiment, an imaging system may include a base module and a camera module. The base module may include a base guide and a connector bank. The connector bank may include a blind mate connector, where the blind mate connector includes a spring connector and is configured to mate with a camera connector. Camera module includes a camera guide configured to be inserted into the base guide, a camera, and a camera connector communicatively connected to the camera and configured to engage the blind mate connector when the camera guide is inserted into the base guide and communicate, at least, the audiovisual data and the power to the blind mate connector when engaged.

Figure 1:
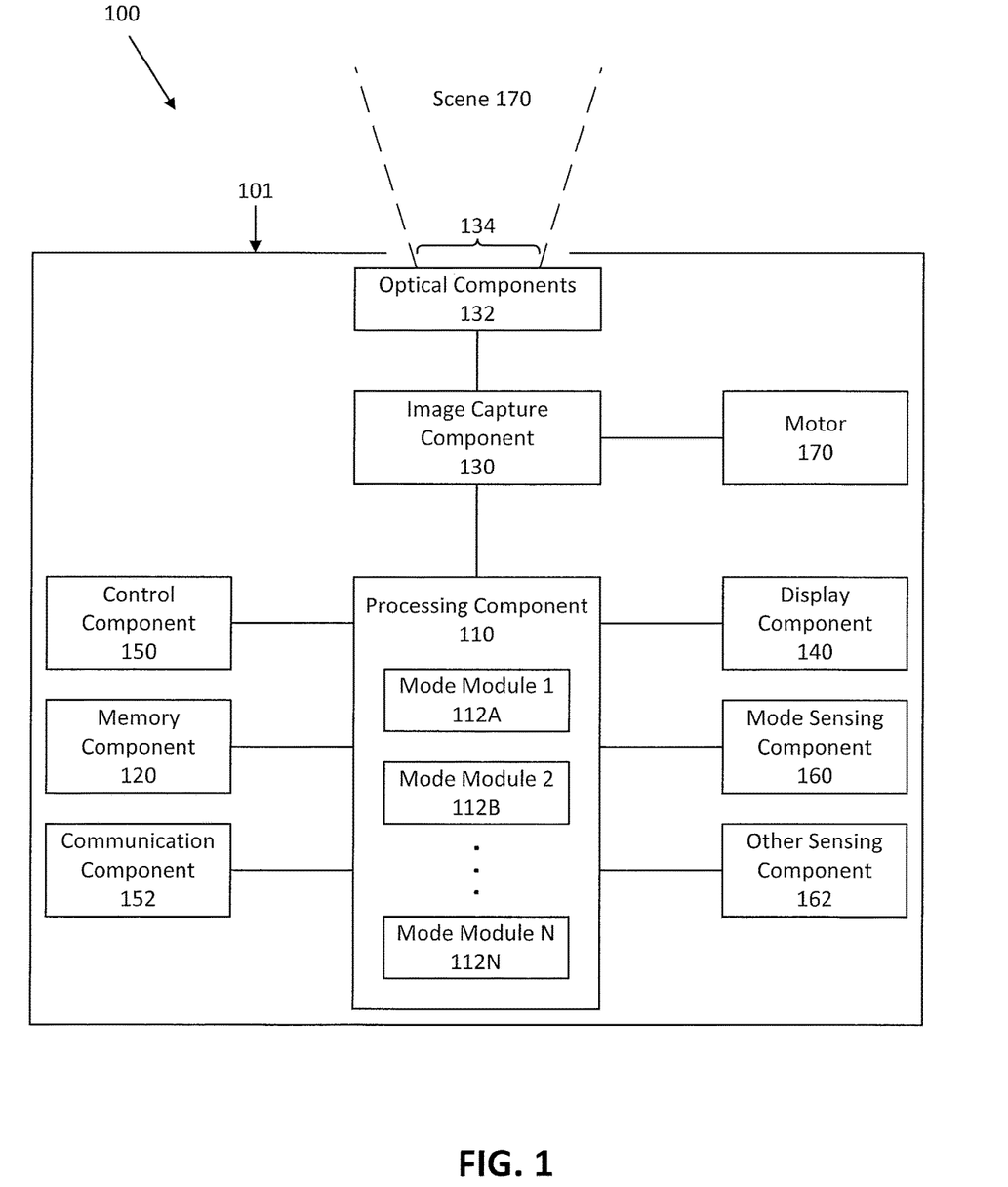
FIG. 1 illustrates a block diagram of an imaging system in accordance with an embodiment of the disclosure.

FIG. 1 illustrates a block diagram of an imaging system 100 in accordance with an embodiment of the disclosure. Imaging system 100 may be used to capture and process image frames in accordance with various techniques described herein. In one embodiment, various components of imaging system 100 may be provided in a housing 101, such as a housing of a camera (e.g., security camera), a personal electronic device (e.g., a mobile phone), or other system. In another embodiment, one or more components of imaging system 100 may be implemented remotely from each other in a distributed fashion (e.g., networked or otherwise).

In one embodiment, imaging system 100 includes a processing component 110, a memory component 120, an image capture component 130, optical components 132 (e.g., one or more lenses configured to receive electromagnetic radiation through an aperture 134 in the housing 101 and pass the electromagnetic radiation to the image capture component 130), a display component 140, a control component 150, a communication component 152, a mode sensing component 160, a sensing component 162, and a motor 170.

In various embodiments, imaging system 100 may be implemented as an imaging device, such as a camera, to capture image frames, for example, of a scene 170 (e.g., a field of view). Imaging system 100 may represent any type of camera system which, for example, detects electromagnetic radiation (e.g., irradiance or visual light) and provides representative data (e.g., one or more still image frames or video image frames). For example, imaging system 100 may represent a camera that is directed to detect one or more ranges (e.g., wavebands) of electromagnetic radiation and provide associated image data. Imaging system 100 may be a portable device and may be implemented, for example, as a handheld device and/or coupled, in other examples, to various types of vehicles (e.g., a land-based vehicle, a watercraft, an aircraft, a spacecraft, or other vehicle) or to various types of fixed locations (e.g., a home security mount, a campsite or outdoors mount, or other location) via one or more types of mounts. In still another example, imaging system 100 may be integrated as part of a non-mobile installation to provide image frames to be stored and/or displayed.

Processing component 110 may include, for example, a microprocessor, a single-core processor, a multi-core processor, a microcontroller, a logic device (e.g., a programmable logic device configured to perform processing operations), a digital signal processing (DSP) device, one or more memories for storing executable instructions (e.g., software, firmware, or other instructions), and/or any other appropriate combination of processing device and/or memory to execute instructions to perform any of the various operations described herein. Processing component 110 is adapted to interface and communicate with components 120, 130, 140, 150, 160, and 162 to perform method and processing steps as described herein. Processing component 110 may include one or more mode modules 112A-112N for operating in one or more modes of operation (e.g., to operate in accordance with any of the various embodiments disclosed herein). In one embodiment, mode modules 112A-112N are adapted to define processing and/or display operations that may be embedded in processing component 110 or stored on memory component 120 for access and execution by processing component 110. In another aspect, processing component 110 may be adapted to perform various types of image processing techniques as described herein.

In various embodiments, it should be appreciated that each mode module 112A-112N may be integrated in software and/or hardware as part of processing component 110, or code (e.g., software or configuration data) for each mode of operation associated with each mode module 112A-112N, which may be stored in memory component 120. Embodiments of mode modules 112A-112N (i.e., modes of operation) disclosed herein may be stored as a machine readable medium in a non-transitory manner (e.g., within a memory, a hard drive, a compact disk, a digital video disk, or a flash memory) to be executed by a computer (e.g., logic or processor-based system) to perform various methods disclosed herein.

In various embodiments, the machine readable medium may be included as part of imaging system 100 and/or separate from imaging system 100, with stored mode modules 112A-112N provided to imaging system 100 by coupling the device storing the machine readable medium to imaging system 100 and/or by imaging system 100 downloading (e.g., via a wired or wireless link) the mode modules 112A-112N from the device storing the machine readable medium. In various embodiments, as described herein, mode modules 112A-112N provide for improved camera processing techniques for real time applications, wherein a user or operator may change the mode of operation depending on a particular application, such as an off-road application, a maritime application, an aircraft application, a space application, or other application. Additional mode modules may also be provided for different planned usages. For example, mode modules may be provided for an export application and an import application.

Memory component 120 includes, in one embodiment, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, processing component 110 is adapted to execute software stored in memory component 120 to perform various methods, processes, and modes of operations in a manner as described herein.

Image capture component 130 includes, in one embodiment, one or more sensors (e.g., any type visible light, infrared, or other type of detector, including a detector implemented as part of a focal plane array) for capturing image signals representative of an image, of scene 170. In one embodiment, the sensors of image capture component 130 provide for representing (e.g., converting) a captured thermal image signal of scene 170 as digital data (e.g., via an analog-to-digital converter included as part of the sensor or separate from the sensor as part of imaging system 100).

In certain embodiments, the motor 170 may be coupled to the image capture component 130. The motor 170 may move components within the image capture component 130. For example, the motor 170 may move a housing, a lens, a cam tube, or a lens cell of the image capture component 130.

Processing component 110 may be adapted to receive image signals from image capture component 130, process image signals (e.g., to provide processed image data), store image signals or image data in memory component 120, and/or retrieve stored image signals from memory component 120. Processing component 110 may be adapted to process image signals stored in memory component 120 to provide image data (e.g., captured and/or processed image data) to display component 140 for viewing by a user.

Display component 140 includes, in one embodiment, an image display device (e.g., a liquid crystal display (LCD)) or various other types of generally known video displays or monitors. Processing component 110 may be adapted to display image data and information on display component 140. Processing component 110 may be adapted to retrieve image data and information from memory component 120 and display any retrieved image data and information on display component 140. Display component 140 may include display electronics, which may be utilized by processing component 110 to display image data and information. Display component 140 may receive image data and information directly from image capture component 130 via processing component 110, or the image data and information may be transferred from memory component 120 via processing component 110.

In one embodiment, processing component 110 may initially process a captured thermal image frame and present a processed image frame in one mode, corresponding to mode modules 112A-112N, and then upon user input to control component 150, processing component 110 may switch the current mode to a different mode for viewing the processed image frame on display component 140 in the different mode. This switching may be referred to as applying the camera processing techniques of mode modules 112A-112N for real time applications, wherein a user or operator may change the mode while viewing an image frame on display component 140 based on user input to control component 150. In various aspects, display component 140 may be remotely positioned, and processing component 110 may be adapted to remotely display image data and information on display component 140 via wired or wireless communication with display component 140, as described herein.

Control component 150 includes, in one embodiment, a user input and/or interface device having one or more user actuated components, such as one or more push buttons, slide bars, rotatable knobs or a keyboard, that are adapted to generate one or more user actuated input control signals. Control component 150 may be adapted to be integrated as part of display component 140 to operate as both a user input device and a display device, such as, for example, a touch screen device adapted to receive input signals from a user touching different parts of the display screen. Processing component 110 may be adapted to sense control input signals from control component 150 and respond to any sensed control input signals received therefrom.

Control component 150 may include, in one embodiment, a control panel unit (e.g., a wired or wireless handheld control unit) having one or more user-activated mechanisms (e.g., buttons, knobs, sliders, or others) adapted to interface with a user and receive user input control signals. In various embodiments, the one or more user-activated mechanisms of the control panel unit may be utilized to select between the various modes of operation, as described herein in reference to mode modules 112A-112N. In other embodiments, it should be appreciated that the control panel unit may be adapted to include one or more other user-activated mechanisms to provide various other control operations of imaging system 100, such as auto-focus, menu enable and selection, field of view (FoV), brightness, contrast, gain, offset, spatial, temporal, and/or various other features and/or parameters. In still other embodiments, a variable gain signal may be adjusted by the user or operator based on a selected mode of operation.

In another embodiment, control component 150 may include a graphical user interface (GUI), which may be integrated as part of display component 140 (e.g., a user actuated touch screen), having one or more images of the user-activated mechanisms (e.g., buttons, knobs, sliders, or others), which are adapted to interface with a user and receive user input control signals via the display component 140. As an example for one or more embodiments as discussed further herein, display component 140 and control component 150 may represent appropriate portions of a smart phone, a tablet, a personal digital assistant (e.g., a wireless, mobile device), a laptop computer, a desktop computer, or other type of device.

Mode sensing component 160 includes, in one embodiment, an application sensor adapted to automatically sense a mode of operation, depending on the sensed application (e.g., intended use or implementation), and provide related information to processing component 110. In various embodiments, the application sensor may include a mechanical triggering mechanism (e.g., a clamp, clip, hook, switch, push-button, or others), an electronic triggering mechanism (e.g., an electronic switch, push-button, electrical signal, electrical connection, or others), an electro-mechanical triggering mechanism, an electro-magnetic triggering mechanism, or some combination thereof. For example for one or more embodiments, mode sensing component 160 senses a mode of operation corresponding to the imaging system's 100 intended application based on the type of mount (e.g., accessory or fixture) to which a user has coupled the imaging system 100 (e.g., image capture component 130). Alternatively, the mode of operation may be provided via control component 150 by a user of imaging system 100 (e.g., wirelessly via display component 140 having a touch screen or other user input representing control component 150).

Furthermore in accordance with one or more embodiments, a default mode of operation may be provided, such as for example when mode sensing component 160 does not sense a particular mode of operation (e.g., no mount sensed or user selection provided). For example, imaging system 100 may be used in a freeform mode (e.g., handheld with no mount) and the default mode of operation may be set to handheld operation, with the image frames provided wirelessly to a wireless display (e.g., another handheld device with a display, such as a smart phone, or to a vehicle's display).

Mode sensing component 160, in one embodiment, may include a mechanical locking mechanism adapted to secure the imaging system 100 to a vehicle or part thereof and may include a sensor adapted to provide a sensing signal to processing component 110 when the imaging system 100 is mounted and/or secured to the vehicle. Mode sensing component 160, in one embodiment, may be adapted to receive an electrical signal and/or sense an electrical connection type and/or mechanical mount type and provide a sensing signal to processing component 110. Alternatively or in addition, as discussed herein for one or more embodiments, a user may provide a user input via control component 150 (e.g., a wireless touch screen of display component 140) to designate the desired mode (e.g., application) of imaging system 100.

Processing component 110 may be adapted to communicate with mode sensing component 160 (e.g., by receiving sensor information from mode sensing component 160) and image capture component 130 (e.g., by receiving data and information from image capture component 130 and providing and/or receiving command, control, and/or other information to and/or from other components of imaging system 100).

In various embodiments, mode sensing component 160 may be adapted to provide data and information relating to system applications including a handheld implementation and/or coupling implementation associated with various types of vehicles (e.g., a land-based vehicle, a watercraft, an aircraft, a spacecraft, or other vehicle) or stationary applications (e.g., a fixed location, such as on a structure). In one embodiment, mode sensing component 160 may include communication devices that relay information to processing component 110 via wireless communication. For example, mode sensing component 160 may be adapted to receive and/or provide information through a satellite, through a local broadcast transmission (e.g., radio frequency), through a mobile or cellular network and/or through information beacons in an infrastructure (e.g., a transportation or highway information beacon infrastructure) or various other wired or wireless techniques (e.g., using various local area or wide area wireless standards).

In another embodiment, imaging system 100 may include one or more other types of sensing components 162, including environmental and/or operational sensors, depending on the sensed application or implementation, which provide information to processing component 110 (e.g., by receiving sensor information from each sensing component 162). In various embodiments, other sensing components 162 may be adapted to provide data and information related to environmental conditions, such as internal and/or external temperature conditions, lighting conditions (e.g., day, night, dusk, and/or dawn), humidity levels, specific weather conditions (e.g., sun, rain, and/or snow), distance (e.g., laser rangefinder), and/or whether a tunnel, a covered parking garage, or that some type of enclosure has been entered or exited. Accordingly, other sensing components 160 may include one or more conventional sensors as would be known by those skilled in the art for monitoring various conditions (e.g., environmental conditions) that may have an effect (e.g., on the image appearance) on the data provided by image capture component 130.

In some embodiments, other sensing components 162 may include devices that relay information to processing component 110 via wireless communication. For example, each sensing component 162 may be adapted to receive information from a satellite, through a local broadcast (e.g., radio frequency) transmission, through a mobile or cellular network and/or through information beacons in an infrastructure (e.g., a transportation or highway information beacon infrastructure) or various other wired or wireless techniques.

In various embodiments, components of imaging system 100 may be combined and/or implemented or not, as desired or depending on application requirements, with imaging system 100 representing various operational blocks of a system. For example, processing component 110 may be combined with memory component 120, image capture component 130, display component 140, and/or mode sensing component 160. In another example, processing component 110 may be combined with image capture component 130 with only certain operations of processing component 110 performed by circuitry (e.g., a processor, a microprocessor, a microcontroller, a logic device, or other circuitry) within image capture component 130. In still another example, control component 150 may be combined with one or more other components or be remotely connected to at least one other component, such as processing component 110, via a wired or wireless control device so as to provide control signals thereto.

In one embodiment, communication component 152 may be implemented as a network interface component (NIC) adapted for communication with a network including other devices in the network. In various embodiments, communication component 152 may include a wireless communication component, such as a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components adapted for communication with a network. As such, communication component 152 may include an antenna coupled thereto for wireless communication purposes. In other embodiments, the communication component 152 may be adapted to interface with a DSL (e.g., Digital Subscriber Line) modem, a PSTN (Public Switched Telephone Network) modem, an Ethernet device, and/or various other types of wired and/or wireless network communication devices adapted for communication with a network.

In various embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) adapted to communicate with other communication networks, such as the Internet. As such, in various embodiments, the imaging system 100 may be associated with a particular network link such as for example a URL (Uniform Resource Locator), an IP (Internet Protocol) address, and/or a mobile phone number.

Figure 2A:
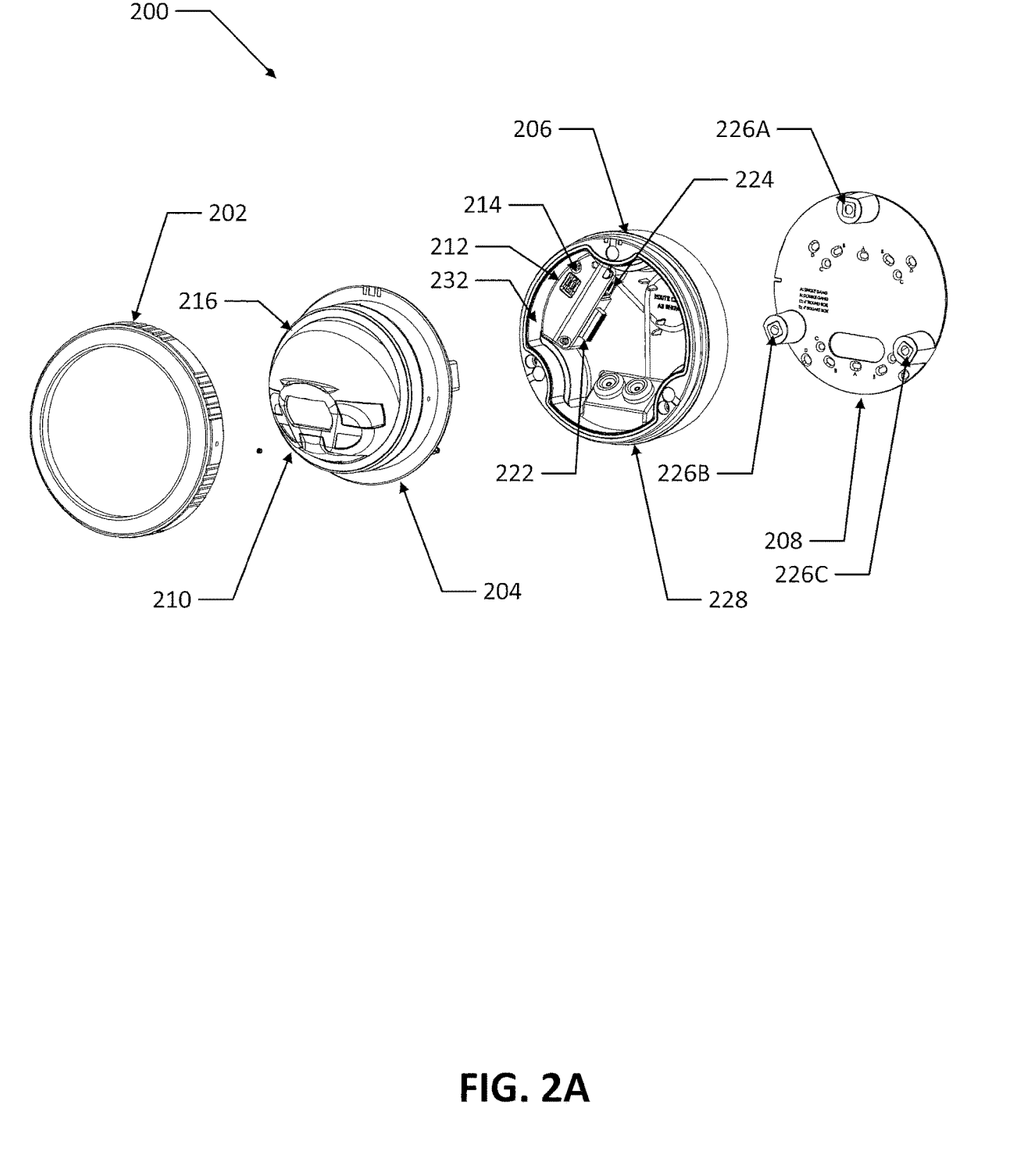
FIGS. 2A and 2B illustrate exploded views of an imaging system in accordance with an embodiment of the disclosure.
Figure 2B:
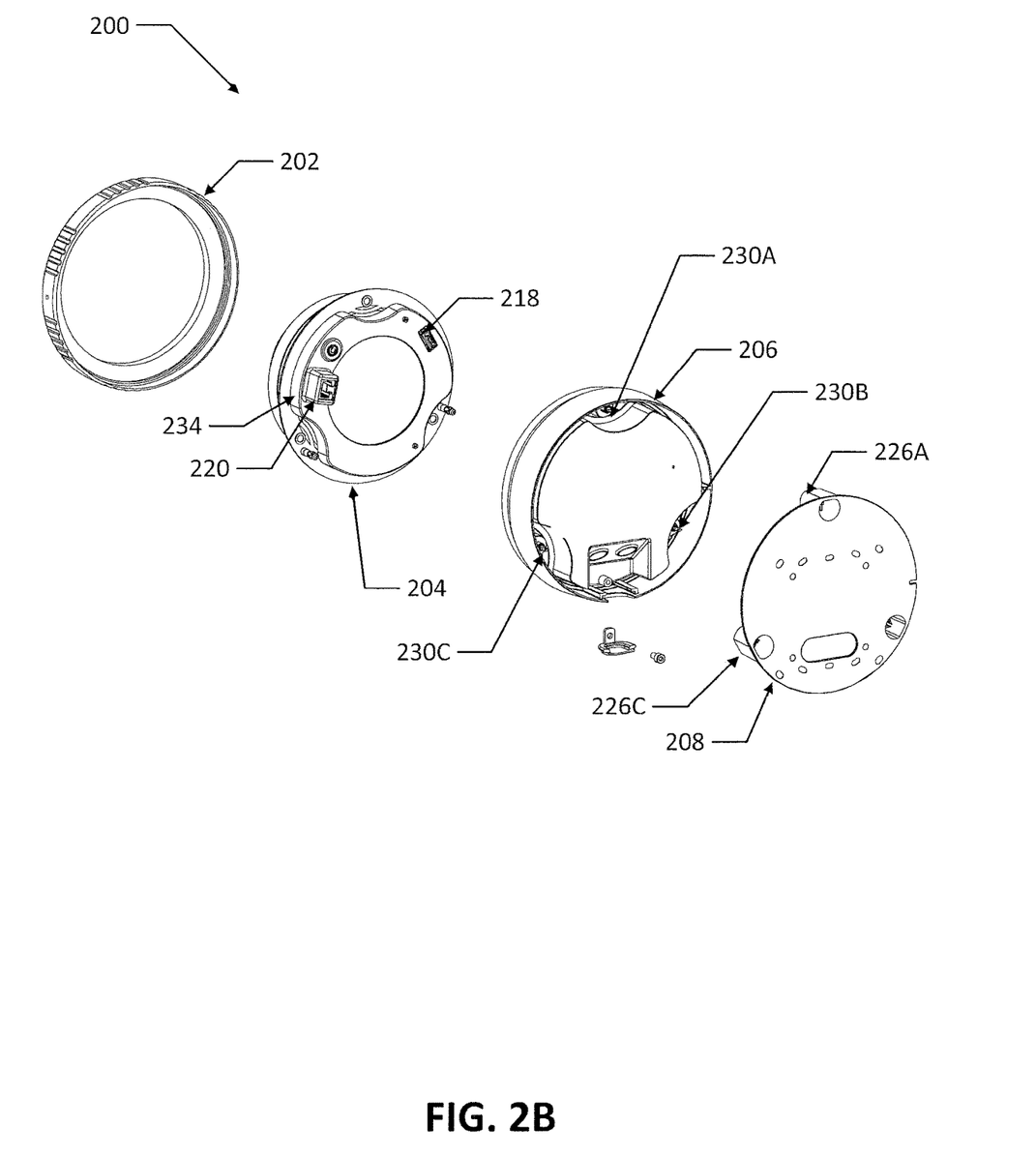

FIGS. 2A and 2B illustrate exploded views of an imaging system in accordance with an embodiment of the disclosure. FIG. 2A may illustrate a front exploded view while FIG. 2B may illustrate a back exploded view. Imaging system 200 includes a locking ring 202, a camera module 204, a base module 206, and an interface plate 208. In a certain example, imaging system 200 may be a security camera, personal camera, and/or other type of imaging system.

The interface plate 208 may be installed on, for example, a wall, fixture, pole, or other item that imaging system 200 may be coupled to. Interface plate 208 may include one or more attachment points (e.g., bolt holes, screws, clips, and/or other components and/or features to couple to walls and/or components described herein), one or more pass-throughs (e.g., pass-throughs for wiring), and/or one or more other features.

Base module 206 may be configured to couple to interface plate 208 via one of more features described herein. For example, as shown in FIG. 2, interface plate 208 includes three spring receptacles 226A-C configured to mate to base module 206 via tool-free quarter turn fasteners (e.g., fasteners 230A-C). Also, base module 206 may include one or more base guides 232. Base guide 232 may receive camera guide 234 of camera module 204 and, thus, allow for base module 206 to couple to camera module 204.

Base module 206 may include, for example, connector bank 214. Connector bank 214 may include one or more connectors configured to be communicatively coupled to camera 210 of camera module 204 and communicate data and/or power to and/or from camera 210 when communicatively coupled to camera 210. The connectors may be terminal ends of one or more cables and such cables may communicate one or more of Ethernet, input/output, camera data (e.g., audio and/or visual data), power, signals, and/or other electromagnetic signals to and/or from camera 210. As such, the connectors may be configured to interface with corresponding connectors of camera module 204 to provide such signals and/or power to camera 210.

In certain embodiments, connector bank 214 may be disposed within a portion of base module 206 (e.g., off to a side of base module 206). Such a portion may be, for example, less than 50% or less than 30% of the floor pan area of base module 206 to allow for improved packaging.

One such connector may be blind mate connector 212. Blind mate connector 212 may be a spring connector that includes spring contacts configured to engage contacts with corresponding connectors disposed on camera module 204 (e.g., connector 218). Such spring contacts may allow for blind mate connector 212 to mate with corresponding connector 218 when there is misalignment between camera module 204 and base module 206 as the spring contacts of blind mate connector 212 are self-aligning. In certain embodiments, the connector can be spring loaded in the lateral direction, the vertical direction, and/or another direction. Thus, for example, lateral spring-loaded connectors can aid in mating of connectors with lateral (e.g., side to side) misalignment. While the embodiment disclosed herein includes blind mate connector 212 on base module 206, other embodiments may include the blind mate connector on camera module 204 alternative or additional to blind mate connector 212 on base module 206.

Connector bank 214 may optimize wire routing within base module 206. For example, such wiring may terminate within a component of base module 206 such as at connector bank 214. In certain embodiments, the base module 206 and/or connector bank 214 may include one or more additional connectors (e.g., connector 222) configured to couple to one or more connectors of camera module 204 (e.g., connector 220) via an intermediate connector, wire, and/or other connection. Such intermediate connector, wire, and/or other connection may be appropriately sized to fit within a cavity of base module 206 without further cable routing. In other embodiments, connector 222 may be, for example, an input/output connector configured to receive a connection routed through interface plate 208 and connector 220 may be a programming port configured to receive data from a programmer. Also, connector 224 may also be a connector that may be an RJ45 connector and/or other such connector that may receive Ethernet, power, audiovisual data, and/or other such data from a wire routed through interface plate 208 and/or via a connection with camera module 204 (e.g., an intermediate connector, wire, and/or other such connection). In certain additional embodiments, connectors 222, 224 and/or connector 220 may be one or more additional quick release and/or blind release connector. Such configurations of connectors described herein may allow for easy installation of camera module 204 without need to connect and/or manage cable loops.

To further optimize wire routing and cable connections, in certain embodiments, connectors of base module 206 may face upwards (e.g., towards camera 210 when mated) and may be configured to mate with corresponding connectors of camera 210. Connectors of base module 206 may face laterally (such as connector 222 shown in FIGS. 2A and 2B) and may be configured to mate with external connections (e.g., from a building or other structure). Such a configuration further simplifies connections and cable routing by allowing for all connections to camera 210 to be through the top of base module 206 (to simplify installation) and all connections to the structure to be laterally connected to minimize bends and cable distance.

Camera module 204 may couple to base module 206 via connectors 218 and 220 and/or one or more clips. Camera module 204 may include camera guide 234 described herein that are configured to be inserted into corresponding base guide 232 of base module 206 to guide the interface of connector 218 with that of blind mate connector 212.

Camera 210 may be any type of camera (e.g., visual, thermal, and/or other such cameras as described herein). Camera 210 may communicate one or more of Ethernet, input/output, camera data (e.g., audio and/or visual data), power, signals, and/or other electromagnetic signals through connectors 218 and/or 220 and blind mate connector 212 to connector bank 214. Connector bank 214 may then communicate such signals through appropriate wiring.

In certain embodiments, camera 210 may be mounted so that camera 210 may be oriented by an installer. For example, camera 210 may be mounted within a housing 216 that may include a dome. The dome may be watertight or may be a partial dome (e.g., half dome). Camera 210 may include a spring loaded ball-and-socket joint arm. The spring loaded ball-and-socket joint arm may hold camera 210 in a set position when camera 210 is not subject to an external force. Camera 210 may then be locked into the set position via, for example, a locking screw.

Locking ring 202 may be thread onto back module 206 to secure camera module 204 to back module 206. Threading on locking ring 202 may compress a seal 228 between camera module 204 and back module 206 to prevent water from leaking into the interior of camera module 204 and back module 206.

Figure 3:
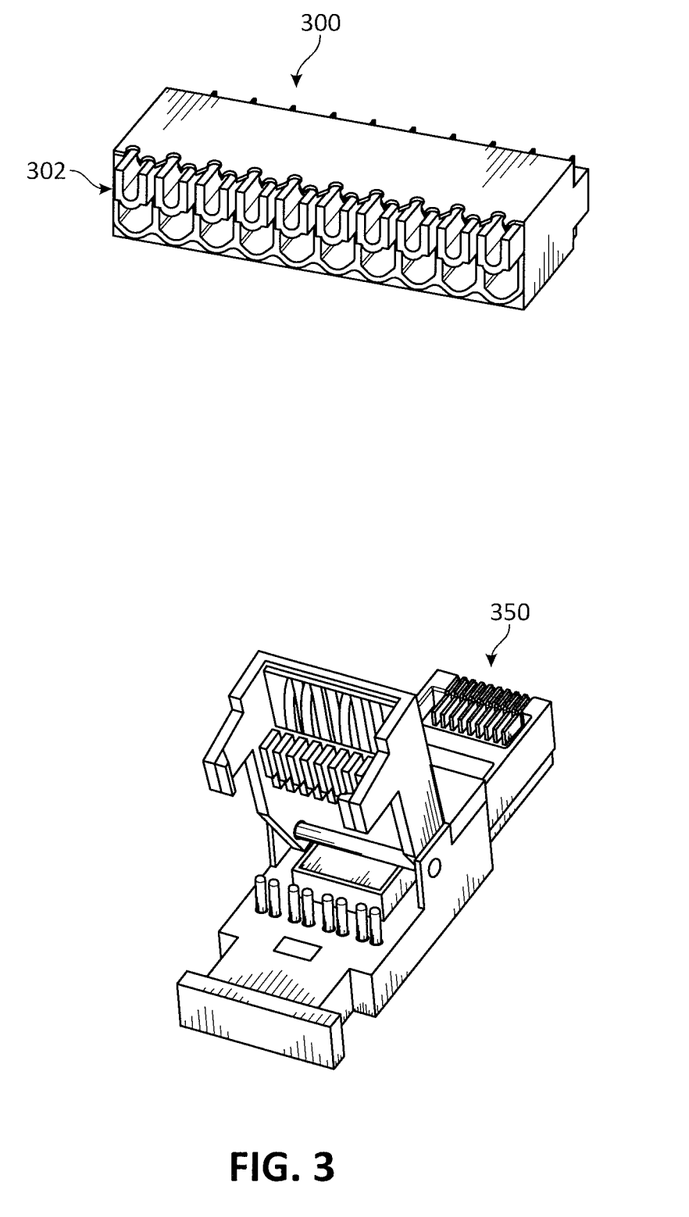
FIG. 3 illustrates various components of the imaging system of FIGS. 2A and 2B in accordance with an embodiment of the disclosure.

FIG. 3 illustrates various components of the imaging system of FIGS. 2A and 2B in accordance with an embodiment of the disclosure. Connector 300 is an input/output connector. Connector 300 illustrates a certain embodiment of a connector that includes spring contacts 302. Spring contacts 302 may allow for misalignment of a mating connector while still being able to interface with the mating connector. In other embodiments, connector 300 can be, for example, a screw terminal or another type of connector. Thus, for example, such a connector may include screw terminals in some or all of the positions of spring contacts 302 illustrated in FIG. 3. In certain embodiments, input/output, audio, visual, and/or power connections may be made through connector 300. Receptacle 350 may include a RJ45 receptacle to accept pre-terminated cables as well as a tool-free RJ45 adapter for un-terminated cables.

Figure 4:
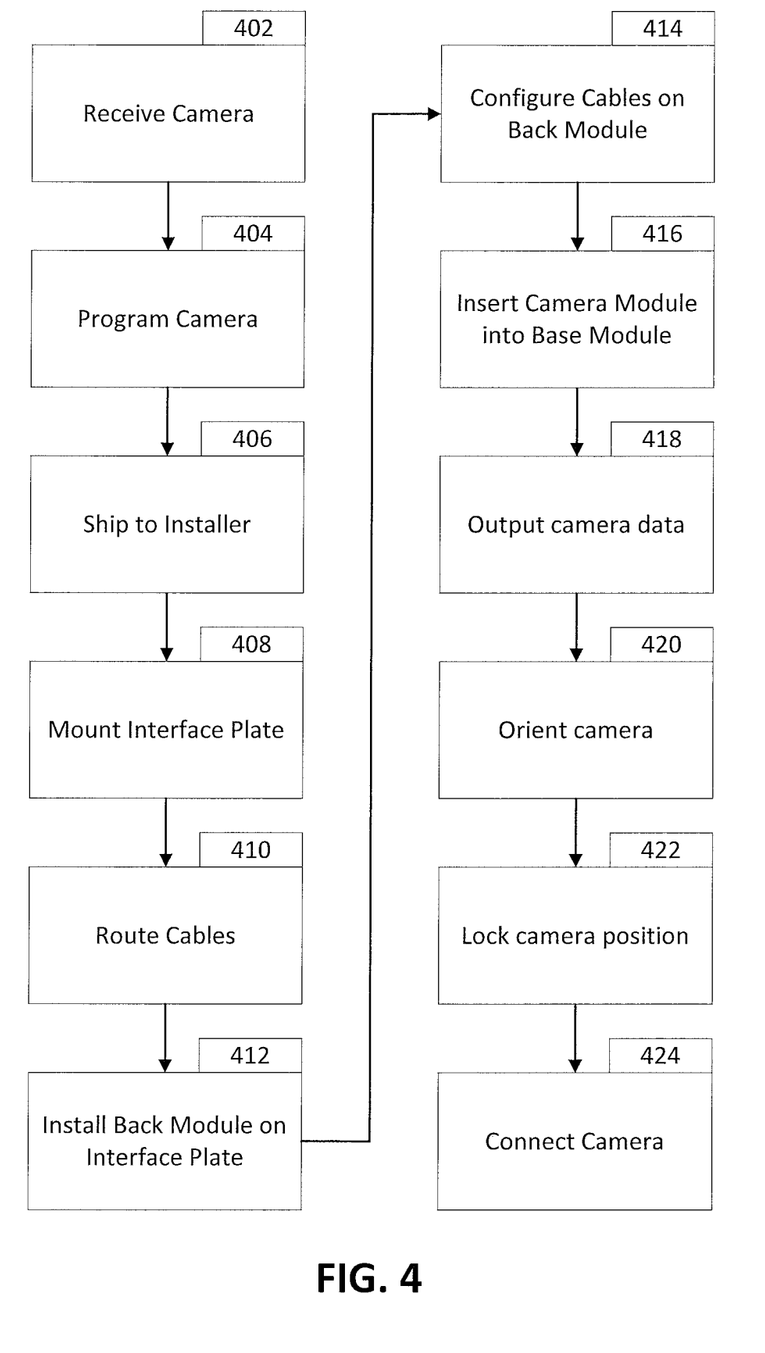
FIG. 4 illustrates a flowchart of a process of installing an imaging system in accordance with an embodiment of the disclosure.

FIG. 4 illustrates a flowchart of a process of installing an imaging system in accordance with an embodiment of the disclosure. In step 402, the camera may be received by a manufacturer or a secondary party. The manufacturer or secondary party may program the camera in step 404 (e.g., by programming an Internet Protocol address into the camera). In certain embodiments, the packaging of the camera may be specifically configured to allow for the camera to be easily programmed. For example, the packaging may orient the camera so that a POE programming port is accessible without removing the camera from the packaging. Details of the programming (e.g., the IP address) may then be written on the packaging for reference. After programming in step 404, the camera may be shipped to the installer in step 406.

The installer may then receive the camera. The installer may then couple the interface plate onto a mounting surface by, for example, screwing the interface plate on the mounting surface in step 408. In certain embodiments, the interface plate may include hole patterns for standard junction boxes, as well as a cable clearance hole to allow for cables to be routed from behind the mounting surface in step 410.

The interface plate may contain a plurality of receptacles 226A, 226B, and 226C configured to mate to back module. Accordingly, the back module may be coupled to the interface plate in step 412. In certain embodiments, the back module may be coupled to the interface plate using quick release fasteners such as tool-free quarter turn push fasteners. Thus, the back module may be easily clipped onto the interface plate and thus secure the back module to the mounting surface.

The back module may include one or more of a connector bank and one or more cables may be routed and/or otherwise connected to the connector bank in step 414. The connector bank may include features that allow for easily accessible termination of Ethernet, input/output, and/or other such cables. Such connections may, for example, be made on a spring-terminal pluggable header for easy tool-free field termination.

Once all desired wires and/or cables are terminated and/or otherwise coupled to the connector bank, wire and/or cable routing may be optimized in the back module. As all connections are made inside the back module, managing cable service loop is not needed as the camera module is mounted to the back module due to the blind mate connector of the connector bank, which electrically connects to the camera module with spring contacts. The camera module may be inserted into the back module and connectors of the camera module may connect to the connectors of the base module in step 416. The camera module may self-align to back module to ensure good contact on the blind mate connector. The camera module may be retained to the back module with, for example, quick release clips. A locking ring may then be coupled (e.g., screwed) onto the back module and compress a seal between the camera module and the back module.

Once the camera module is coupled to the back module, image data and/or other data from the camera may be output via, for example, a Bluetooth connection (or other type of wireless connection), in step 418. Viewing the output from the camera via the Bluetooth connection, the installer can orient the camera towards the intended region of interest in step 420. For example, the camera may be mounted on a spring-loaded payload to allow for easy pointing. Other embodiments may mount the camera on a ball-and-socket joint arm for pointing. In either case, the installer may use an installation mobile application to view a Bluetooth image of the camera feed. Such instant feedback may allow the camera to be quickly positioned correctly, which is particularly useful for hard-to-reach mounting sites.

Once the position of the camera is set, the position of the camera may be locked by, for example, tightening a locking screw in step 422. Additionally, the Bluetooth with the camera may be disabled after installation to prevent future security breaches. The camera may be then connected to a normal output in step 424 for normal operation (e.g., a network connection).

Figure 5A:
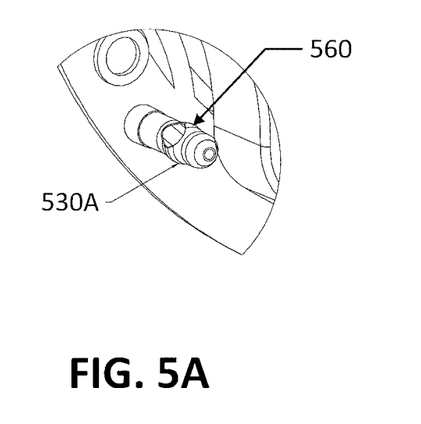
FIGS. 5A-C illustrate various embodiments of clips for securing a camera module to a back module in accordance with an embodiment of the disclosure.
Figure 5B:
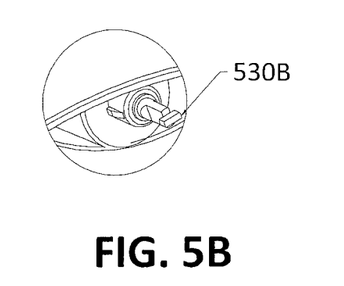
Figure 5C:
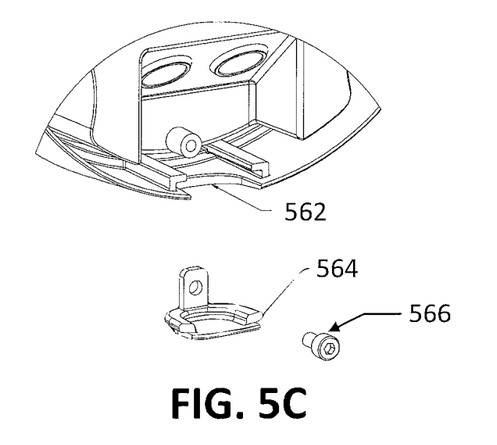

FIGS. 5A-C illustrate various embodiments of clips for securing a back module to an interface plate in accordance with an embodiment of the disclosure. FIG. 5A may illustrate a cup style fastener 530A. The cup style fastener 530A may include a flared end 560 and, once inserted into an opening, the flared end 560 may provide resistance to prevent back module 206 from being removed from interface plate 208.

FIG. 5B may illustrate a quarter turn fastener 530B. The quarter turn fastener 530B may be inserted into a corresponding opening. Once inserted, the quarter turn fastener 530B may then be turned to prevent the quarter turn fastener 530B from backing out of the opening.

FIG. 5C may illustrate a conduit opening 562 with a removable cover 564. When the fastener is inserted into a corresponding opening, the removable conduit opening cover 564 may be placed over the conduit opening 562 and an insert (screw) 566 placed to hold the removable conduit opening cover 564 over the conduit opening 562.

Figure 6A:
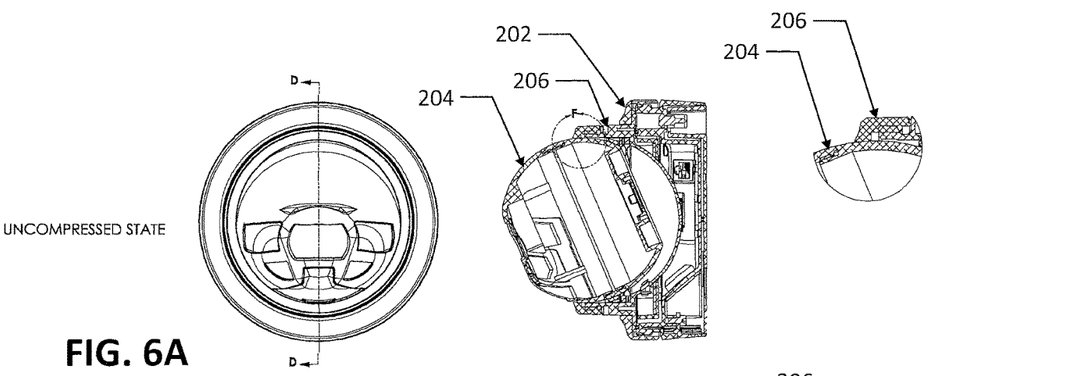
FIGS. 6A and 6B illustrate the imaging system in an uncompressed state and a compressed state, respectively, in accordance with an embodiment of the disclosure.
Figure 6B:
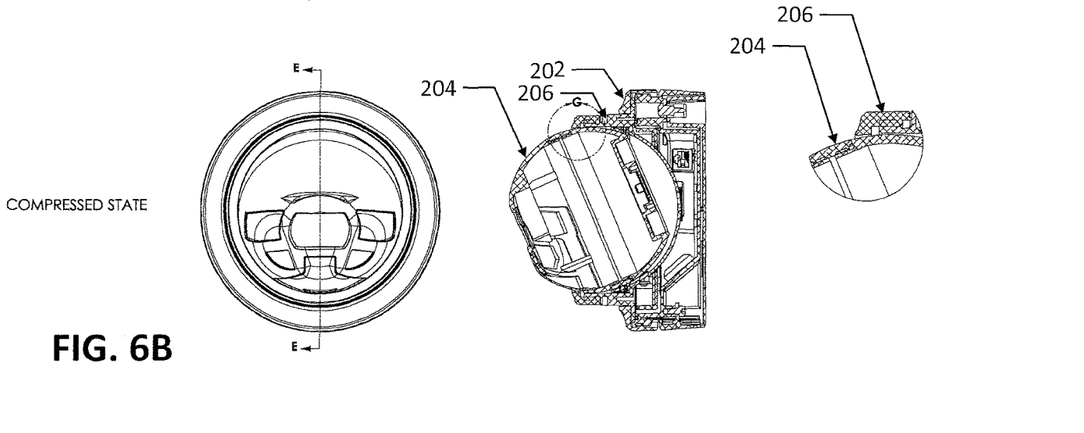

FIGS. 6A and 6B illustrate the imaging system in an uncompressed state and a compressed state, respectively, in accordance with an embodiment of the disclosure. FIG. 6A shows back module 206 and camera module 204 in an uncompressed state. As such, the locking ring 202 and/or other locking mechanism may not be engaged and, thus camera module 204 may not be locked to back module 206.

FIG. 6B shows back module 206 and camera module 204 in a compressed state. As such, the locking ring 202 and/or other locking mechanism may be engaged and, accordingly, a portion of the base module 206 may be tightened onto camera module 204 to form a watertight seal (e.g., by compressing one or more seals).

Figure 7:
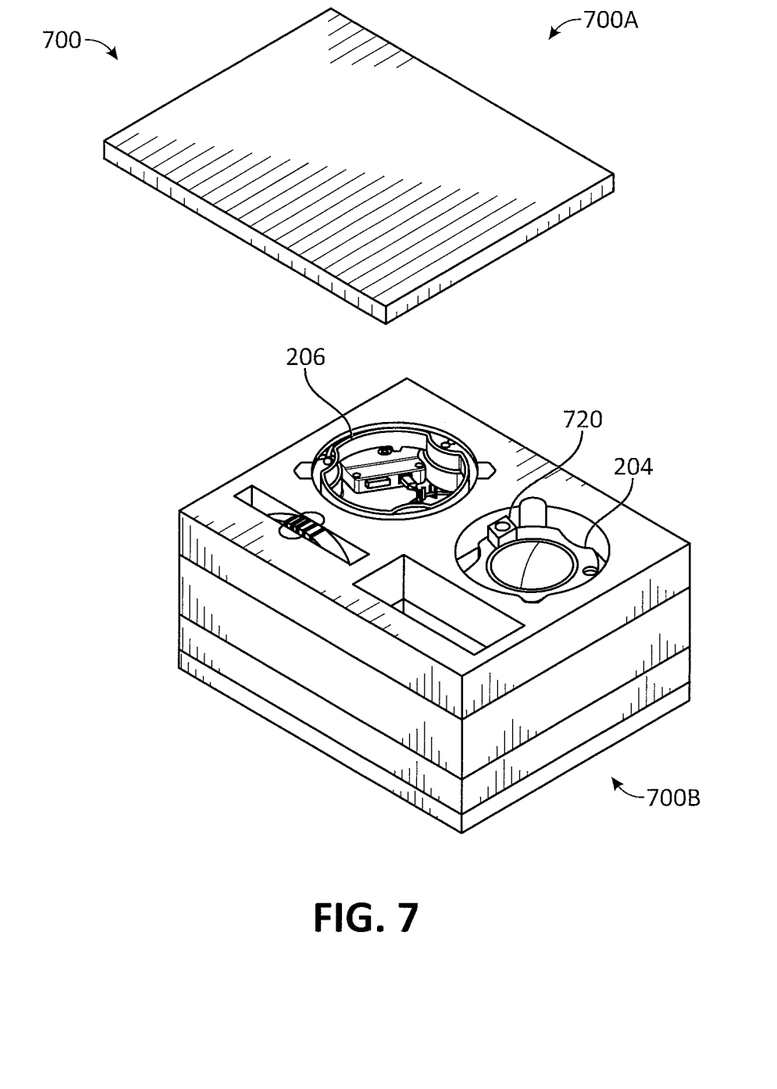
FIG. 7 illustrates packaging of the imaging system in accordance with an embodiment of the disclosure.

FIG. 7 illustrates packaging of the imaging system in accordance with an embodiment of the disclosure. FIG. 7 may illustrate packaging assembly 700 that includes module holder 700B and cover 700A. Module holder 700B orients camera module 204 so that a programming port 720 is accessible without removing the camera module from the module holder 700B. Thus, camera module 204 can be programmed while still disposed within module holder 700B. Cover 700A may be disposed over module holder 700B to protect camera module 204 when camera module 204 is held by module holder 700B.

In various embodiments, a simplification of a camera system installation process may be described herein. Typical camera systems may be difficult to install due to complex cable routing, specific installation tool requirements, varied installation environments, and other factors. The installation process described herein may be configured to be simple, tool-free, and optimized for visual verification. Such an installation process may utilize a blind mate connection between a camera module and a back module to enable simple cable management and termination. Additionally, the camera of the camera module may include a water tight spherical payload in a socket (e.g., eyeball) that may wirelessly output camera data (e.g., via Bluetooth or other wireless connections) to allow for more convenient camera viewpoint calibration. Once the camera viewpoint has been set, the position of the camera may be locked via a locking screw.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. An apparatus comprising:
   a base module comprising:
      a base guide; and
      a connector bank comprising a blind mate connector; and
   a camera module comprising:
      a camera guide configured to be inserted into the base guide;
      a camera; and
      a camera connector communicatively connected to the camera and configured to engage the blind mate connector when the camera guide is inserted into the base guide and communicate, at least, audiovisual data and power to the blind mate connector when engaged;

wherein the camera is movable within the camera module during camera installation for the camera to be oriented towards a region of interest during the installation while the camera connector engages the blind mate connector and the camera provides audio-visual data to a wireless link for viewing by an installer during the installation for the installer to orient the camera towards the region of interest during the installation;

wherein the apparatus further comprises:
 a first locking mechanism configured to lock a position of the camera within the camera module when the installer has oriented the camera towards the region of interest during the installation; and
 an output configured to be connected to the camera for normal operation after the installation when the camera position has been locked and the wireless link is disabled.

2. The apparatus of claim 1, wherein the blind mate connector comprises a spring connector, and the first locking mechanism comprises a locking screw.

3. The apparatus of claim 1, wherein the base guide and/or the camera guide comprises one or more clips configured to lock the camera module relative to the base module before the camera provides the audiovisual data to the wireless link during the installation.

4. The apparatus of claim 1, wherein the camera is disposed within a spring-loaded ball housing disposed within a socket, and wherein a spring rate of a spring of the spring-loaded ball housing is configured to hold the ball housing within the socket.

5. The apparatus of claim 4, further comprising a second locking mechanism configured to lock a position of the spring-loaded ball housing, wherein the locking mechanism comprises:
 a locking ring of the socket disposed around a perimeter of the spring-loaded ball housing; and
 a third locking mechanism configured to tighten the locking ring around the spring-loaded ball housing.

6. The apparatus of claim 4, wherein the spring-loaded ball housing is waterproof.

7. The apparatus of claim 4, wherein the spring-loaded ball housing is configured to be rotated when unlocked.

8. The apparatus of claim 1, further comprising a Bluetooth module providing access to the wireless link.

9. The apparatus of claim 1, wherein the connector bank further comprises a second connector configured to mate with a structure connector.

10. The apparatus of claim 9, wherein the blind mate connector is forward facing and the second connector is laterally facing.

11. The apparatus of claim 1, further comprising an interface plate comprising an opening and configured to couple to the base module.

12. The apparatus of claim 11, wherein the interface plate comprises a spring receptacle, wherein the base module comprises a fastener configured to be inserted into the spring receptacle.

13. The apparatus of claim 12, wherein the fastener is configured to move between a first position and a second position, wherein the first position is configured to allow insertion of the fastener into the spring receptacle, and wherein the second position is configured to lock the base module to the interface plate.

14. A method of operating the apparatus of claim 11, the method comprising:
 coupling the base module on the interface plate;
 routing a cable through the opening of the interface plate to the base module;
 terminating the cable to the connector bank;
 coupling the camera module to the base module by inserting the camera guide of the camera module into the base guide of the base module;
 engaging the camera connector with the blind mate connector;
 moving the camera within the camera module to orient the camera towards a region of interest while the camera connector engages the blind mate connector;
 outputting camera data while the camera is being oriented;
 locking the camera position by the first locking mechanism when the camera has been oriented, the first locking mechanism comprising a locking screw, wherein locking the camera position comprises tightening the locking screw;
 disabling the wireless link after the camera has been oriented; and
 using the camera with the wireless link being disabled.

15. A method of camera installation, the method comprising:
 coupling a camera module comprising a camera to a base module by inserting a camera guide of the camera module into a base guide of the base module;
 engaging a camera connector of the camera module with a blind mate connector of a connector bank of the base module to enable the camera to output visual data to a wireless link for installation or to a normal output for normal operation;
 providing, by the camera, visual data to the wireless link for viewing by an installer during the installation as the installer moves the camera within the camera module to orient the camera towards a region of interest during the installation while the camera connector engages the blind mate connector;
 locking a position of the camera within the camera module when the installer has oriented the camera towards the region of interest during the installation; and
 connecting the camera to the normal output for normal operation when the camera position has been locked and the wireless link is disabled.

16. The method of claim 15, further comprising:
 programming the camera module while the camera module is disposed within a module holder of a packaging assembly; and
 removing the camera module from the module holder;
 wherein the wireless link provides the visual data to a mobile application for viewing by the installer.

17. The method of claim 15, further comprising, before coupling the camera module to the base module:
 coupling the base module on an interface plate;
 routing a cable through an opening of the interface plate to the base module;
 terminating the cable to the connector bank of the base module; and
 locking the camera module relative to the base module with one or more clips.

18. The method of claim 15, wherein the camera is disposed within a spring-loaded ball housing disposed within a socket, and wherein the method further comprises:
 rotating a position of the spring-loaded ball housing.

19. The method of claim 18, further comprising:
 locking the position of the spring-loaded ball housing.

20. The method of claim 15, wherein access to the wireless link is provided by a Bluetooth module.

* * * * *